(12) United States Patent
Rotariu et al.

(10) Patent No.: US 11,300,784 B2
(45) Date of Patent: Apr. 12, 2022

(54) MULTI-PERSPECTIVE EYE ACQUISITION

(71) Applicant: FotoNation Limited, Galway (IE)

(72) Inventors: Cosmin Nicolae Rotariu, Galway (IE); Istvan Andorko, Galway (IE)

(73) Assignee: FotoNation Limited, Galway (IE)

( * ) Notice: Subject to any disclaimer, the term of this patent is extended or adjusted under 35 U.S.C. 154(b) by 0 days.

(21) Appl. No.: 16/797,294

(22) Filed: Feb. 21, 2020

(65) Prior Publication Data

US 2021/0263307 A1 Aug. 26, 2021

(51) Int. Cl.
| | |
|---|---|
| *G02B 27/00* | (2006.01) |
| *G02B 27/09* | (2006.01) |
| *G06K 9/00* | (2022.01) |
| *G02B 27/01* | (2006.01) |

(52) U.S. Cl.
CPC ....... *G02B 27/0093* (2013.01); *G02B 27/017* (2013.01); *G02B 27/0977* (2013.01); *G06K 9/00604* (2013.01); *G02B 2027/0138* (2013.01)

(58) Field of Classification Search
CPC .............. G02B 27/0093; G02B 27/017; G02B 27/0977; G02B 2027/0138; G06K 9/00604; G06K 9/0061; G06K 9/00617; G06K 9/3216; G06F 21/32
See application file for complete search history.

(56) References Cited

U.S. PATENT DOCUMENTS

| | | | |
|---|---|---|---|
| 4,919,529 A | 4/1990 | Hyun | |
| 6,992,717 B2 | 1/2006 | Hatano | |
| 7,931,370 B2 | 4/2011 | Prat Bartomeu | |
| 8,132,912 B1 | 3/2012 | Northcott et al. | |
| 8,212,870 B2 | 7/2012 | Hanna et al. | |
| 9,202,443 B2 | 12/2015 | Perez et al. | |
| 10,698,481 B1* | 6/2020 | Najafi Shoushtari | ... G06F 3/013 |
| 2003/0169334 A1 | 9/2003 | Braithwaite et al. | |
| 2009/0147126 A1* | 6/2009 | Miyoshi | ............... H04N 5/2254 348/360 |

(Continued)

FOREIGN PATENT DOCUMENTS

| | | |
|---|---|---|
| EP | 0596868 A2 | 5/1994 |
| JP | 2002170108 A | 6/2002 |

(Continued)

OTHER PUBLICATIONS

Kar et al., "A Review and Analysis of Eye-Gaze Estimation Systems, Algorithms and Performance Evaluation Methods in Consumer Platforms," Accepted for Publication in IEEE Access. DOI 10.1109/ACCESS.2017.2735633, retrieved at <<https://arxiv.org/ftp/arxiv/papers/1708/1708.01817.pdf>> 25 pages.

*Primary Examiner* — Ke Xiao
*Assistant Examiner* — James S Nokham
(74) *Attorney, Agent, or Firm* — Lee & Hayes, P.C.

(57) ABSTRACT

A device, such as a head-mounted device (HMD), may include a frame and a plurality of mirrors coupled to an interior portion of the frame. An imaging device may be coupled to the frame at a position to capture images of an eye of the wearer reflected from the mirrors. The HMD may also include a mirror angle adjustment device to adjust an angle of one or more of the mirrors relative to the imaging device so that the mirror(s) reflect the eye of the wearer to the imaging device.

20 Claims, 10 Drawing Sheets

(56) References Cited

U.S. PATENT DOCUMENTS

| | | | | |
|---|---|---|---|---|
| 2010/0103077 A1* | 4/2010 | Sugiyama | .......... | G02B 27/0172 |
| | | | | 345/8 |
| 2011/0157707 A1* | 6/2011 | Tilleman | ................ | G03B 21/14 |
| | | | | 359/630 |
| 2013/0038510 A1* | 2/2013 | Brin | ..................... | G02B 27/017 |
| | | | | 345/8 |
| 2013/0169683 A1 | 7/2013 | Perez et al. | | |
| 2015/0077312 A1* | 3/2015 | Wang | ................... | G02B 27/017 |
| | | | | 345/7 |
| 2015/0116199 A1* | 4/2015 | Yang | ................. | G02B 27/0172 |
| | | | | 345/156 |
| 2015/0123991 A1 | 5/2015 | Yarosh et al. | | |
| 2015/0146301 A1* | 5/2015 | Wong | ................ | G02B 27/0172 |
| | | | | 359/633 |
| 2015/0326570 A1* | 11/2015 | Publicover | ......... | G06K 9/00604 |
| | | | | 726/4 |
| 2016/0195723 A1 | 7/2016 | Murray et al. | | |
| 2017/0140223 A1* | 5/2017 | Wilson | ............... | G02B 27/0093 |
| 2018/0276467 A1 | 9/2018 | Kaehler | | |
| 2018/0365490 A1* | 12/2018 | Agrawal | ............. | G06K 9/0061 |
| 2019/0250409 A1* | 8/2019 | Stafford | ............. | G02B 27/0172 |
| 2019/0258064 A1* | 8/2019 | Ayres | ................ | G02B 27/0172 |

FOREIGN PATENT DOCUMENTS

| | | | |
|---|---|---|---|
| JP | 2008523475 A | 7/2008 | |
| WO | WO2017108699 A1 | 6/2017 | |
| WO | WO2017108703 A1 | 6/2017 | |
| WO | WO-2017179938 A1 * | 10/2017 | ............. G02B 23/04 |

\* cited by examiner

MULTI-PERSPECTIVE EYE ACQUISITION

BACKGROUND

Head-mounted devices, such as augmented reality (AR) and virtual reality (VR) headsets, may provide information to a wearer. Some head-mounted devices track an eye gaze of the wearer by tracking, for example, a portion of the eyes of the wearer. For example, an iris and/or a pupil of the eye of the wearer or a glint of a near-infrared wavelengths reflected from the eye may be tracked in order to identify objects the wearer is viewing. Further, in some examples, the head-mounted display may biometrically authenticate a wearer.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
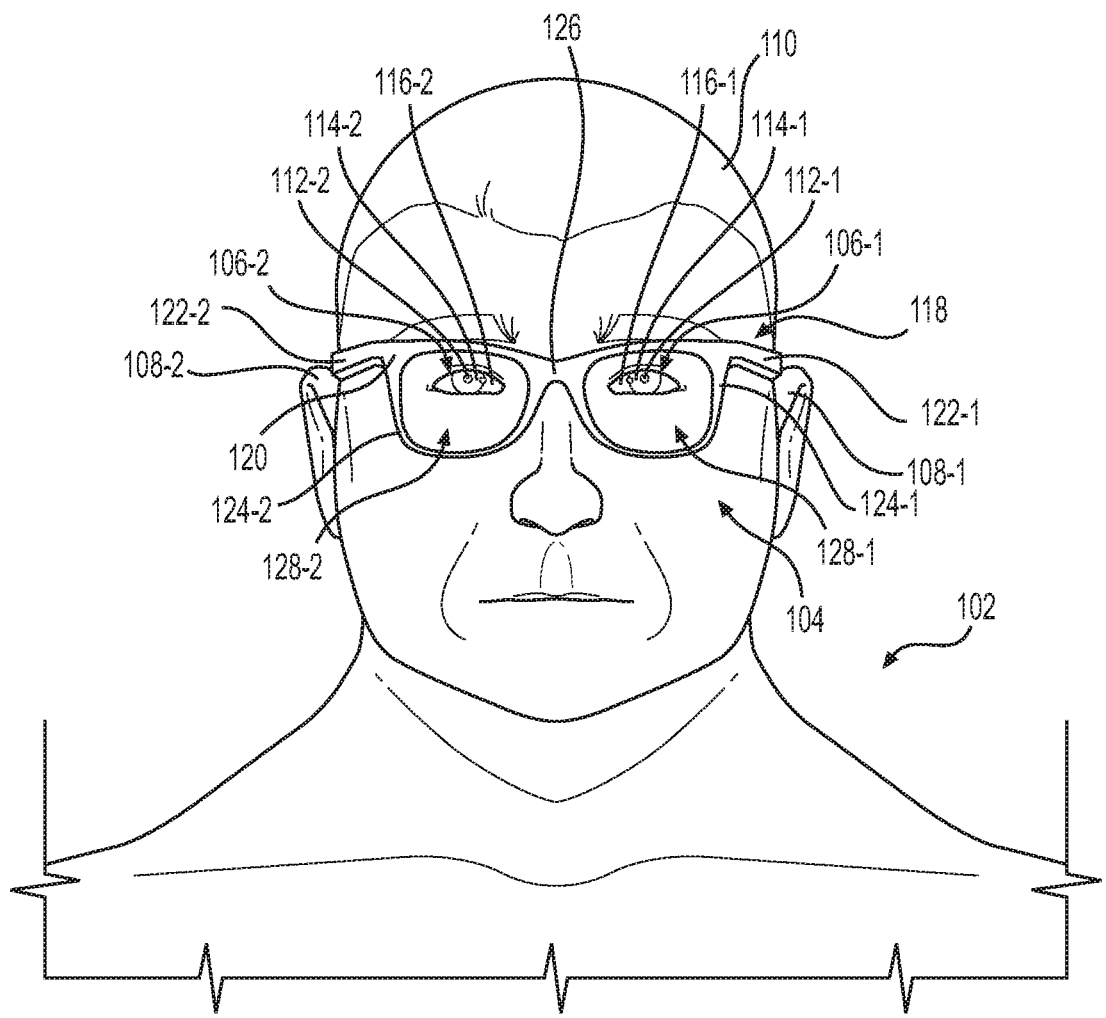
FIG. 1 illustrates an example head-mounted device (HMD) situated on a face of a user.

Some head-mounted displays include imaging devices directed toward the face of the user that track the gaze of the user and/or perform biometric authentication processes. However, a single imaging device directed toward the wearer's face may, in some instances, produce inaccurate authentications or may not sufficiently capture the eye of the wearer. In some instances, multiple imaging devices may be employed. However, the use of multiple imaging devices significantly increases costs associated with the production and retail of the head-mounted device. Still further, the inclusion of multiple imaging devices may result in additional computational processing in order to form a data set from the multiple imaging devices through fusion processes, image stitching processes, and other data processing methods. This additional data processing may result in the inclusion of additional and/or more costly hardware as well as longer data processing times.

As described herein, a single imaging device directly imaging an eye of a wearer of a head-mounted device (HMD) may result in inaccurate biometric authentication of the wearer and/or tracking of a gaze of the wearer. Further, a single imaging device may not provide viable images that sufficiently capture, for example, an iris of the eye of the wearer. Further, inclusion of a plurality of imaging devices will result in a relatively more expensive HMD which may be prohibitively expensive to produce.

This application describes systems, devices, and methods that may, in some examples, overcome these and other disadvantages. For instance, systems and devices described herein include multiple mirrors coupled a portion of the device or system, and an imaging device positioned to capture images of an eye of a user reflected from the mirrors. The mirrors may be positioned at different locations around a periphery of the user's eye so that the images reflected to the imaging device are images of the eye from different perspectives or vantage points. In this way, even if the eye is obstructed or occluded (e.g., by an eyelash or eyelid) from the perspective of one of the mirrors, the imaging device may still capture a suitable image of the eye reflected from one or more other mirrors. In this way, the techniques described in this application provide reliable and robust gaze tracking and eye acquisition.

In some examples, devices or systems according to this application may be implemented as a pair of glasses, goggles, a helmet, or other HMD that may be worn by the user. In that case, the multiple mirrors may be coupled to an interior portion of a frame of the HMD, and imaging device may be coupled to a portion of the frame and oriented so that the multiple mirrors are simultaneously within a field of view of the imaging device. In some examples, the device or system may also include a mirror angle adjustment device to adjust an angle of one or more of the multiple mirrors relative to the imaging device so that the mirrors are aligned to reflect a portion of the eye (e.g., an iris, a pupil, etc.) and/or a region surrounding the eye of the wearer to the imaging device. In some examples, the device or system may include on or more light sources to illuminate an eye of the user.

In some examples, a HMD according to this application may comprise a pair of glasses, which include a front frame having two eyepieces connected by a bridge. In that case, multiple mirrors may be coupled to an interior portion of the front frame to reflect an eye of the wearer from different perspectives. The HMD in this example may also include a pair of arms coupled to the front frame, and an imaging device coupled to at least one of the arms at a position to capture images of the eye reflected by the multiple mirrors. In some examples, two imaging devices may be provided, with one imaging device coupled to each arm of the glasses. In some examples, one or more light sources may be coupled to the interior portion of the front frame proximate the mirrors to direct electromagnetic radiation at a face of the user to illuminate one or both eyes of the wearer. In some examples, the electromagnetic radiation emitted from the light source(s) may comprise infrared or near infrared wavelengths of electromagnetic radiation, so that the illumination is imperceptible (or minimally perceptible) to the wearer, and the imaging device may be configured to detect electromagnetic radiation having wavelengths including those emitted by the light source(s). However, as discussed further below, in other examples the light sources may emit electromagnetic radiation in a visible light range and/or the light sources may be omitted entirely.

Still further, examples described herein provide a method of capturing images of an eye of a user. The method may include capturing, with an imaging device, an image of a plurality of mirrors coupled to an interior portion of a device such as a HMD. The plurality of mirrors may reflect electromagnetic radiation reflected from the eye of a user of the device. The method may also include adjusting, with a mirror angle adjustment device, an angle of at least one of the mirrors relative to the eye of the user to reflect an iris of the eye, and tracking, with a processor executing a tracking component, a gaze direction of the iris.

While this application describes examples in which the device or system is implemented as an HMD, the techniques described herein are not limited to HMDs. For instance, the techniques described herein may additionally or alternatively be implemented in a cockpit or passenger compartment of a vehicle, in a room as part of a video conferencing system, or in other examples employing gaze tracking and/or iris authentication.

FIG. 1 illustrates an example head-mounted device (HMD) 118 as situated on a face 104 of a wearer 102, according to an example of the principles described herein. Throughout the description herein, the terms "user" and wearer" are used to refer to an individual using a device or system employing the techniques described herein. As used herein, the term "wearer" means any individual to whom a HMD according to this application is coupled (e.g., the individual wearing the HMD 118). As used herein, the term "user" also includes "wearers" and also includes individuals using a non-head-mounted device or system. In the examples described herein, the HMD 118 may include an eyeglasses form factor as depicted in FIGS. 1-7. However, the elements and methods described herein in connection with the HMD 118 may be utilized in connection with other form factor HMD devices such as, for example, goggles, a hat, a heads-up display (HUD), a headset, a helmet, or any other head- or face-mounted device, and combinations of these form factors. Further, as noted above, techniques described in this application also can be applied to non-head-mounted devices and systems, such as a cockpit or passenger compartment of a vehicle, in a room as part of a video conferencing system, or in other examples employing gaze tracking and/or iris authentication.

With reference to the eyeglasses form factor HMD 118 depicted throughout the figures, the HMD 118 may include a front frame 120, a first arm 122-1 coupled to a first side of the front frame 120, and a second arm 122-2 coupled to a second side of the front frame 120. The arms 122-1, 122-2 may also be referred to as temples or earpieces that extend toward the back of the head 110 of the wearer and rest on top of a first ear 108-1 and a second ear 108-2 of the wearer 102, respectively.

The front frame 120 of the HMD 118 may include a first eyepiece 124-1 and a second eyepiece 124-2 coupled together via a bridge 126. The eyepieces 124-1, 124-2 may include a first aperture 128-1 and a second aperture 128-2 respectively defined therein to allow the wearer 102 to view past or through the HMD 118. In some examples, the apertures 128-1, 128-2 may be replaced or may include a projection or display device to present images to the user. In other examples, the apertures 128-1, 128-2 may not include any material. In still other examples, the apertures 128-1, 128-2 may include transparent lenses that may include non-prescription or prescription lenses.

FIG. 1 also depicts a first eye 106-1 and a second eye 106-2 of the wearer 102. The eyes 106-1, 106-2 of the wearer 102 (e.g., a human eye) may each include a sclera 116-1, 116-2, an iris 114-1, 114-2, and a pupil 112-1, 112-2, respectively, as imageable elements of the eyes 106-1, 106-2.

Figure 2:
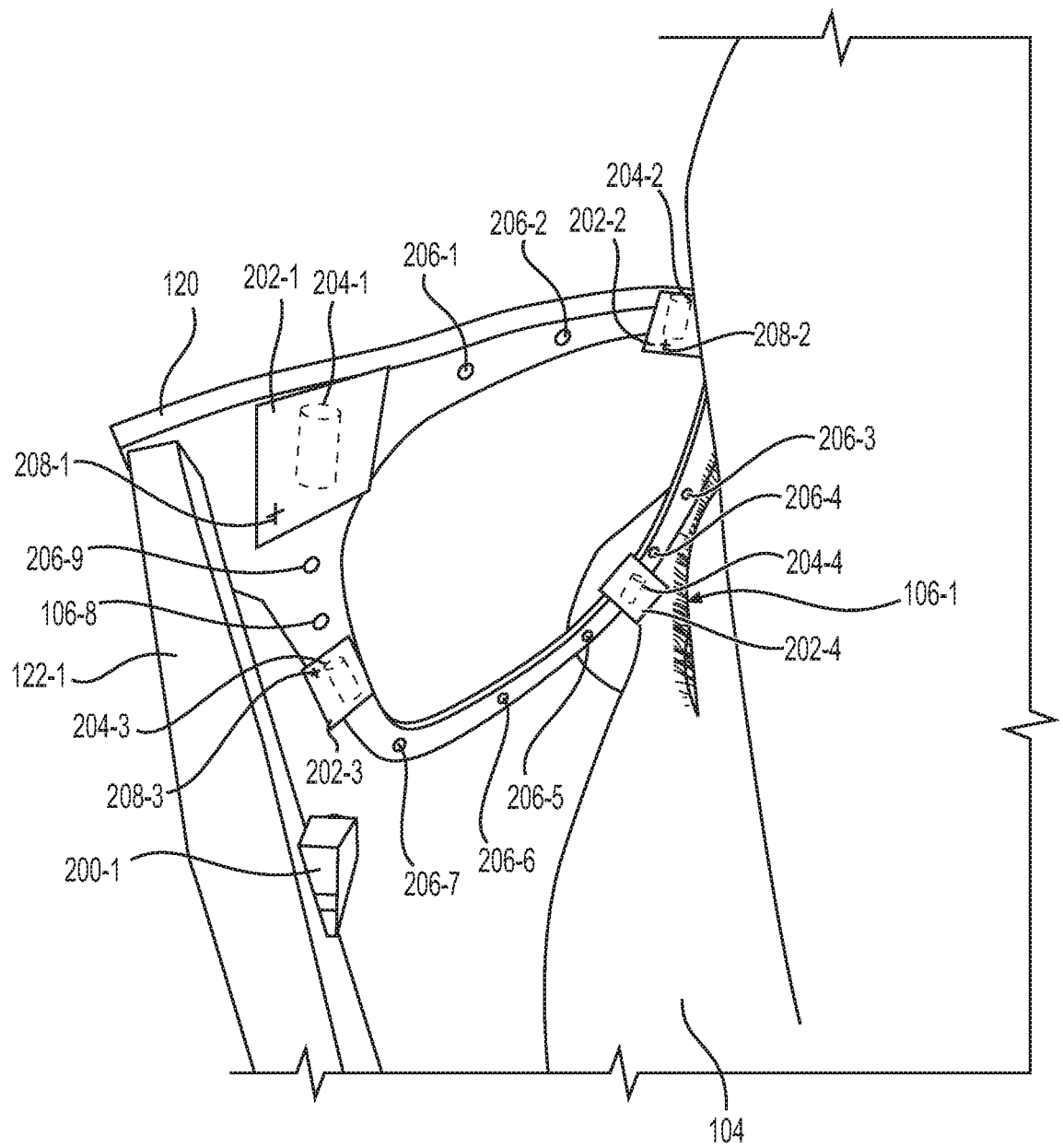
FIG. 2 illustrates a perspective view of the example HMD depicting an internal portion of a first side of the example HMD.
Figure 3:
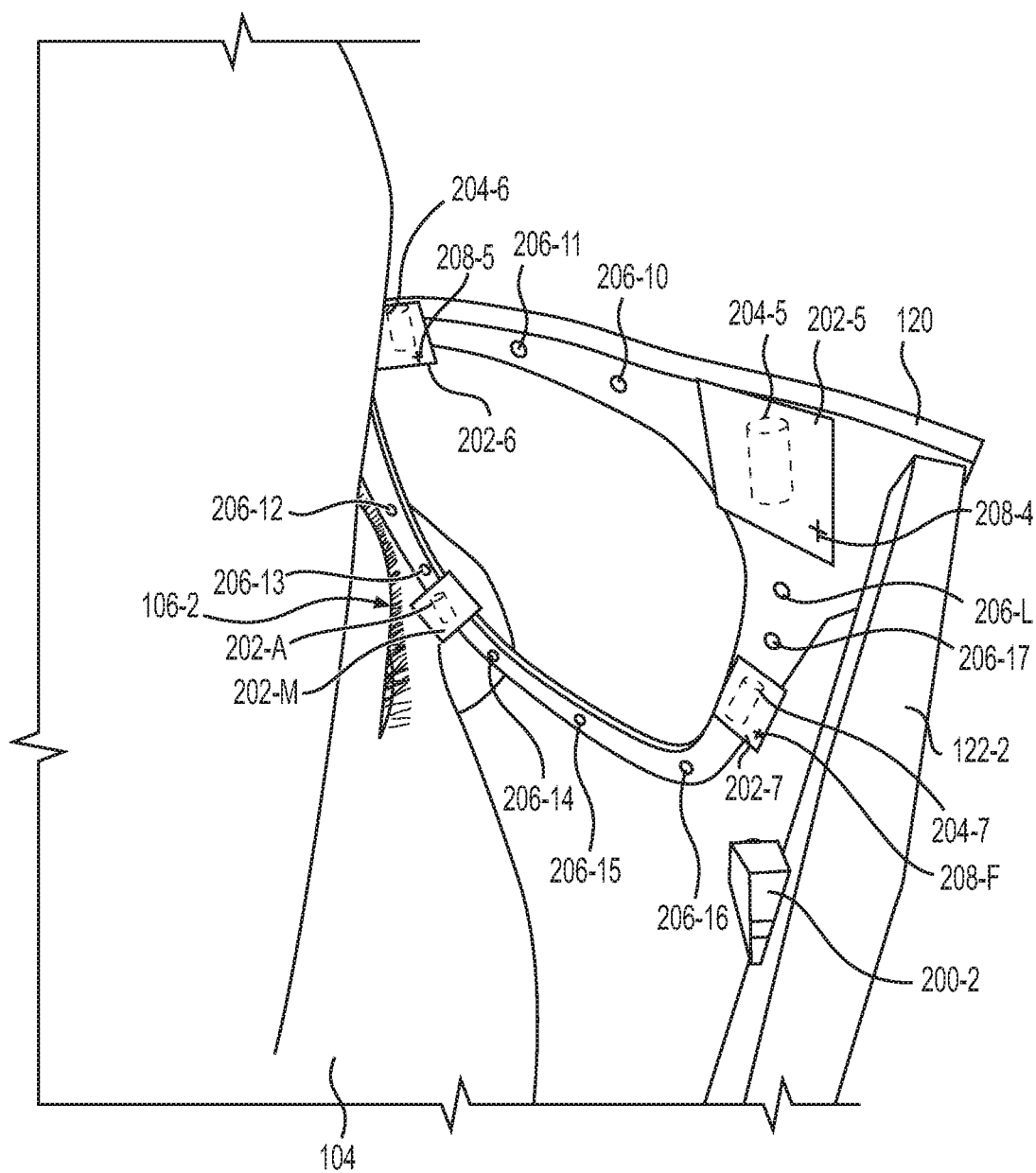
FIG. 3 illustrates a perspective view of the example HMD depicting an internal portion of a second side of the example HMD.

FIG. 2 illustrates a perspective view of the example HMD 118 of FIG. 1, depicting an internal portion of a first side of the HMD 118. FIG. 3 illustrates a perspective view of the HMD 118 depicting an internal portion of a second side of the HMD 118, according to an example of the principles described herein. As depicted in FIGS. 2 and 3, elements of the internal portions of the HMD 118 may be included on both eyepieces 124-1, 124-2 of the HMD 118 in order to capture images of both the left eye 106-1 and right eye 106-2 of the wearer 102. Therefore, description related to FIG. 2 applies equally to FIG. 3, and vice versa.

The interior portion of the HMD 118 may include any surface of the HMD 118 that faces the face 104 of the wearer 102. The interior surface of the HMD 118 may include a number of mirrors including a first mirror 202-1, a second mirror 202-2, a third mirror 202-3, a fourth mirror 202-4, a fifth mirror 202-5, a sixth mirror 202-6, a seventh mirror 202-7, and an eighth mirror 202-M where M is any integer greater than or equal to 1 (collectively referred to herein as mirrors 202 unless specifically addressed otherwise). Although eight mirrors 202 are depicted in FIGS. 2 and 3, any plurality of mirrors 202 may be coupled to the interior portion of the HMD 118. Although depicted having quadrilateral shapes, the mirrors 202 may have any shape including square shapes, elliptical shapes, polygonal shapes, abstract shapes, shapes with edges that conform with portions of the front frame 120 on which they are located, and/or combinations thereof.

In one example, the mirrors 202 may include flat mirrors with no concavity or convexity. In another example, the mirrors 202 may be at least partially concave, at least partially convex, or may have concave, convex, and/or flat portions. In some examples, the mirrors 202 may include flat, concave, and/or convex mirrors among the number of mirrors 202. In some examples, the mirrors may be substantially a same or uniform shape, while in other examples some or all of the mirrors may be different shapes depending on their placement on the frame.

In one example, any or all of the mirrors 202 may protrude from the surfaces of the front frame 120, may lie flush with the surfaces of the front frame 120, or may be recessed within the front frame 120. In the examples described herein, one or more mirror angle adjustment devices may be mechanically coupled to the mirrors 202 to allow for the angle of at least one of the mirrors 202 to be adjusted in order to reflect the eyes 106-1, 106-2 of the wearer 102 to the imaging devices 200-1, 200-2. In one example, the mirror angle adjustment devices may include a ball and ball-and-socket joint coupling the mirror 202 to the front frame 120. In this example, a wearer 102 or other individual may manually adjust the angle of the mirrors 202 by apply pressure to the sides of the mirrors 202 overcoming any friction that may cause the mirrors 202 to otherwise remain stationary.

In some examples, at least one of the mirrors 202 may be mechanically coupled to one or more actuators, such as a first actuator 204-1, a second actuator 204-2, a third actuator 204-3, a fourth actuator 204-4, a fifth actuator 204-5, a sixth actuator 204-6, a seventh actuator 204-7, and an eighth actuator 204-A, where A is any integer greater than or equal to 1 (collectively referred to herein as mirrors 204 unless specifically addressed otherwise). The actuators 204 may move their respective mirrors in any number of coordinate directions based on signals or instructions provided to the actuators 204 from, for example, a processor. As described in more detail herein, the angle at which the mirrors 202 are positioned relative to the surfaces of the front frame 120 may be adjusted via activation of the actuators 204 in order to have the mirrors 202 reflect the eyes 106-1, 106-2 of the wearer 102 such that an imaging device 200-1, 200-2 may view the eyes 106-1, 106-2 of the wearer 102 from the perspective at which the imaging device 200-1, 200-2 is located.

The HMD 118 may also include a first imaging device 200-1 coupled to the first arm 122-1 and a second imaging device 200-2 coupled to the second arm 122-2. The imaging devices 200-1, 200-2 are directed generally in the direction of the mirrors 202 and toward the front of the HMD 118. When positioned on the arms 122-1, 122-2 and directed toward the mirrors 202, the imaging devices 200-1, 200-2 are able to capture a single image, a series of images, and/or video including a number of frames of images and provide these images and video as data to a processing device. These types of data are referred to herein as "images" or "frames."

Further, the imaging devices 200-1, 200-2 may capture images of a plurality of the mirrors 202. In these examples, the first imaging device 200-1 may be able to capture an image that includes at least two of the first mirror 202-1, the second mirror 202-2, the third mirror 202-3, and the fourth mirror 202-4. In one example, the first imaging device 200-1 may capture an image than includes all of the first mirror 202-1, the second mirror 202-2, the third mirror 202-3, the fourth mirror 202-4. Similarly, the second imaging device 200-2 may be able to capture an image that includes at least two of the fifth mirror 202-5, the sixth mirror 202-6, the seventh mirror 202-7, and the eighth mirror 202-M. Further, in one example, the second imaging device 200-2 may capture an image than includes all of the fifth mirror 202-5, the sixth mirror 202-6, the seventh mirror 202-7, and the eighth mirror 202-M. Being able to capture a plurality of reflected images of the eyes 106-1, 106-2 of the wearer 102 by the imaging device 200-1, 200-2 as reflected from the mirrors 202 allows for associated gaze tracking processes to utilize a plurality of images of the eyes 106-1, 106-2 to obtain more accurate and precise tracking of the pupils 112-1, 112-2 and irises 114-1, 114-2 of the wearer 102. Further, being able to capture a plurality of reflected images of the eyes 106-1, 106-2 of the wearer 102 by the imaging device 200-1, 200-2 from the mirrors 202 allows for associated biometric authentication processes to utilize a plurality of images of the eyes 106-1, 106-2 that result in more accurate and precise image of the irises 114-1, 114-2 of the wearer 102 for the purposes of authenticating the wearer 102. More regarding the processes associated with gaze tracking and biometric authentication utilizing multiple images of the eyes 106-1, 106-2 of the wearer 102 is described herein.

The imaging devices 200-1, 200-2 may be instructed by a processor to capture a single image, multiple images, perform periodic imaging, perform continuous imaging, and perform image streaming, among other types of image capture. Further, the imaging devices 200-1, 200-2 may be configured to start and/or stop image capture, such as when receiving a command from the wearer 102, an application, the processor, or other devices. In the examples described herein, the imaging devices 200-1, 200-2 may include any imaging device capable of obtaining high definition (HD) images and/or video. An HD imaging device may be defined as any image capture device capable of obtaining images and/or video having a resolution higher than a standard definition and including at least a resolution higher than 480 vertical lines. In one example, HD may include 720 vertical lines, 1,080 vertical lines, or more. In one example, the number of frames per second refreshed with a new image in HD may include 50 Hertz (Hz), or 60 Hz.

Further, the imaging devices 200-1, 200-2 may include any camera capable of detecting electromagnetic radiation in the visible, ultraviolet (UV), and/or infrared (IR) spectrums. In one example, the imaging devices 200-1, 200-2 may include any camera capable of detecting electromagnetic radiation longer than 700 nanometers including near IR and IR wavelengths.

The imaging devices 200-1, 200-2 may have a field of view large enough to capture an image all the mirrors 202 simultaneously. In this example, the focal length of the optics within the imaging devices 200-1, 200-2 may be such that the field of view allows for the imaging devices 200-1, 200-2 to capture an image of their respective four mirrors 202 (as separately depicted FIGS. 2 and 3) in in a single image. In one example, the imaging devices 200-1, 200-2 may have a vertical field of view (FOV) of approximately 50 degrees and a horizontal FOV of approximately 46 degrees. Further, in one example, the imaging devices 200-1, 200-2 may have a resolution at least as high as 400 vertical pixels and 400 horizontal pixels. The focal length of the imaging devices 200-1, 200-2 may be, for example, 50 millimeters (mm). Further, the imaging devices 200-1, 200-2 may have a least line pairs per mm (lp/mm) value along the image plane of at least 2 at a modulation transfer function (MTF) value of at least 60. Further, in one example, the imaging devices 200-1, 200-2 may include a wide-angle lens that assists the imaging devices 200-1, 200-2 in meeting the above characteristics.

The imaging devices 200-1, 200-2 may be fixedly mounted on the arms 122-1, 122-2. The imaging device 200-1, 200-2 may be fixedly mounted in order to allow for spatial calibration of the imaging device 200-1, 200-2 relative to the mirrors 202. In one example, calibration of the imaging devices 200-1, 200-2 may be performed using a number of fiducials 208-1, 208-2, 208-3, 208-4, 208-5, 208-6 (collectively referred to herein as fiducials 208 unless specifically addressed otherwise) located on at least one of the mirrors 202 imaged by the imaging devices 200-1, 200-2. For example, as depicted in FIG. 2 and FIG. 3, a first fiducial 208-1, a second fiducial 208-2, and a third fiducial 208-3 may be located on the first mirror 202-1, the second mirror 202-2, and the third mirror 202-3, respectively, to allow the first imaging device 200-1 to be calibrated with respect to these mirrors 202-1, 202-2, 202-3. Similarly, a fourth fiducial 208-4, a fifth fiducial 208-5, and a sixth fiducial 208-6 may be located on the fifth mirror 202-5, the sixth mirror 202-6, and the seventh mirror 202-7, respectively, to allow the second imaging device 200-2 to be calibrated with respect to these mirrors 202-5, 202-6, 202-7. The fiducials 208 are depicted in FIGS. 2 and 3 as including intersecting vertical and horizontal lines in the form of a cross. However, the shape and size of the fiducials 208 may include any shape and size that allows for the detection of distortions of the fiducials 208 when imaged. In one example, the fiducials 208 may include a quick response (QR) code, a bar code, or any other machine-readable code or shape. Further, in one example, the fiducials 208 may be printed on the surface of the mirror(s) 202, etched within the surface of the mirror(s) 202, and included below the surface of the mirror(s) 202, among other methods of displaying the fiducials 208. In these examples, the fiducials 208 may be positioned on the mirror(s) 202 such that the fiducials 208 do not occlude images of, for example the eyes 106-1, 106-2 of the wearer 102 when reflected from the mirror 202 to the imaging devices 200-1, 200-2.

Calibration may include instructing the imaging devices 200-1, 200-2 to capture an image of the respective mirrors 202 and identifying the fiducials 208 on the respective mirrors 202 within the captured calibration image. Distances and/or angles between the imaging devices 200-1, 200-2 and their respective mirrors 202 may be determined based on the calibration image and the shape and size of the fiducials 208 as imaged. For example, if a fiducial 208 has a distorted shape and/or size as compared to predetermined shapes and sizes of the fiducials 208, this distortion may be used to define any optical aberrations that may exist.

The determined optical aberrations may be compared, using a processor executing a calibration component, to a look-up table or other data to determine a degree or level of deviation between the imaging devices 200-1, 200-2 and the mirrors 202. These optical aberrations and degree of deviation may be accounted for in further image processing such as gaze tracking and biometric authentication as described herein. In the examples described herein, at least one fiducial 208 may be located on a mirror 202 to allow the respective imaging device 200-1, 200-2 to determine the optical aberrations for calibration purposes. In the example depicted in FIGS. 2 and 3, a plurality of fiducials 208 may be located on a corresponding plurality of mirrors 202 to provide for more accurate calibration of the position of the imaging devices 200-1, 200-2 relative to the mirrors 202.

Figure 6:
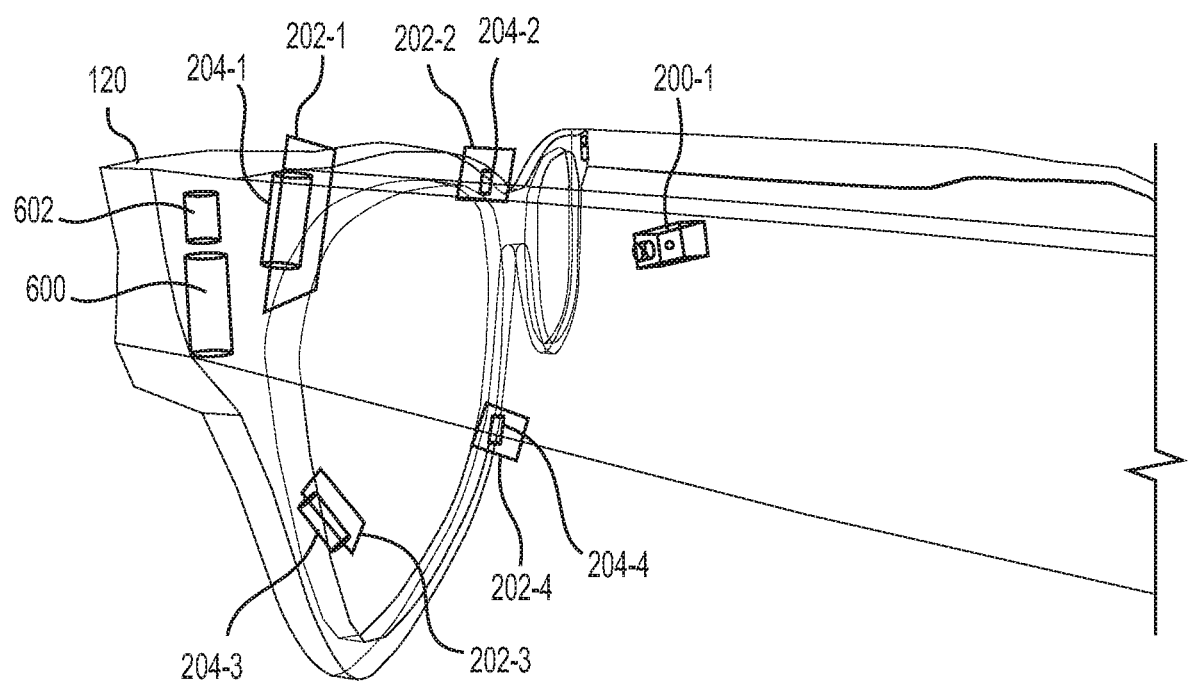
FIG. 6 illustrates a perspective, wireframe view of the example HMD depicting a number of example actuators and sensors.
Figure 7:
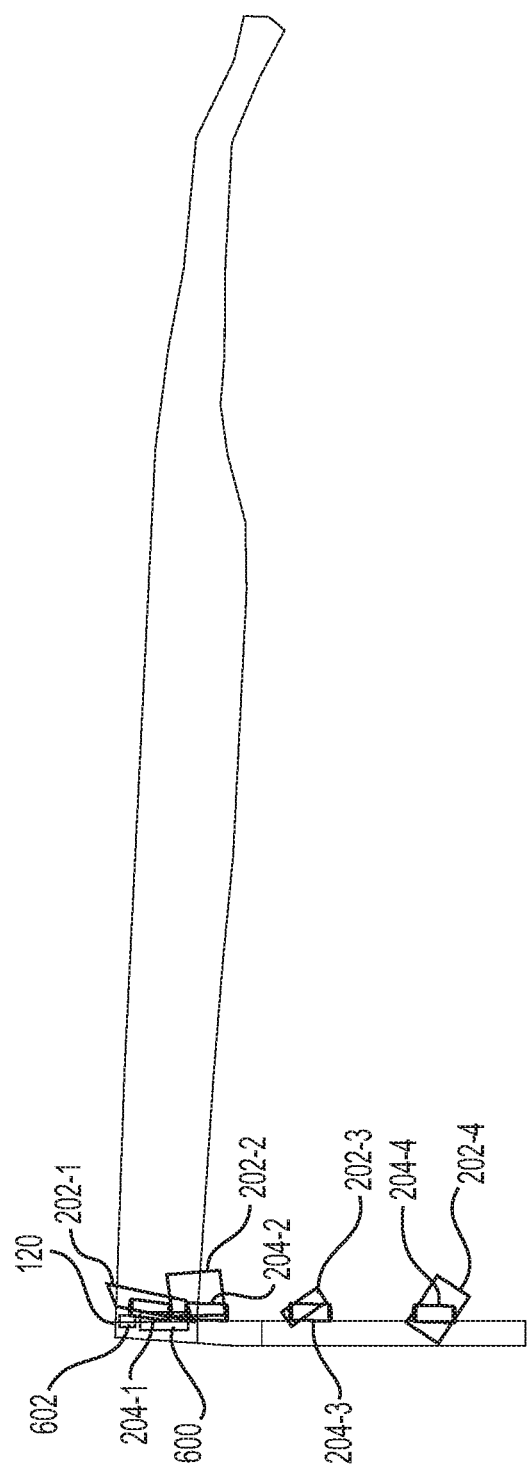
FIG. 7 illustrates a side, wireframe view of the example HMD depicting a number of example actuators and sensors.

Further regarding calibration, the arms 122-1, 122-2 of the HMD 118 may be rigidly fixed to the front frame 120 such that the arms 122-1, 122-2 do not move relative to the front frame 120. In another example, the arms 122-1, 122-2 of the HMD 118 may be rigidly fixed to the front frame 120, but may be made of a material such as a plastic or an acetate such that the arms 122-1, 122-2 may deflect due to an elastic and/or plastic deformation relative to the front frame 120. In still another example, and with reference to FIGS. 6 and 7 illustrating perspective and side, wireframe views of the HMD 118, the arms 122-1, 122-2 of the HMD 118 may be rotatably coupled to the front frame 120 via a hinge 600. Thus, in examples where the arms 122-1, 122-2 may deflect relative to the front frame 120 or the arms 122-1, 122-2 of the HMD 118 are rotatably coupled to the front frame 120 via the hinge 600, the calibration process may be performed each time the arms 122-1, 122-2 deflect or are rotated about the hinge 600 in order to account for any changes in distances and/or angles between the imaging devices 200-1, 200-2 and the mirrors 202. In one example, the calibration processes described herein may be performed when the wearer 102 places the HMD 118 on their face 104, periodically as the HMD 118 is located on the face 104 of the wearer 102, continually as the HMD 118 is located on the face 104 of the wearer 102, and combinations thereof.

In one example, a position sensor such as a rotary encoder 602 depicted in FIGS. 6 and 7 may be coupled to the arms 122-1, 122-2 and/or the hinges 600 to detect a degree of rotation of the arms 122-1, 122-2 with respect to the front frame 120. The rotary encoder 602 may include any electromechanical device that converts the angular position or motion of a shaft or axle such as the hinge 600 to analog or digital output signals. In one example, the output of the rotary encoder 602 may provide a signal that indicates a current shaft position such as an angle transducer may provide. In another example, the output of the rotary encoder 602 may provide information about the motion of the shaft that may be processed into information such as position, speed, and distance.

The degree of rotation of the arms 122-1, 122-2 with respect to the front frame 120 as detected by the rotary encoder 602 may correspond to a degree of optical aberration that exists between the imaging devices 200-1, 200-2 and the mirrors 202. Thus, instead of or in addition to the use of the fiducials 208 to calibrate the position of the imaging devices 200-1, 200-2 with respect to the mirrors 202, the rotary encoder 602 may provide a signal to a processor that defines a rotational position of the arms 122-1, 122-2 with respect to the front frame 120. The signal may be processed by the processor to define the position of the imaging devices 200-1, 200-2 with respect to the mirrors 202 and any corresponding optical aberrations that may be considered when calibrating the imaging devices 200-1, 200-2 of the HMD 118. Thus, in the examples described herein, the calibration of the position of the imaging devices 200-1, 200-2 with respect to the mirrors 202 may include data obtained from the imaging devices 200-1, 200-2, data obtained from the rotary encoder 602, and combinations thereof to determine the optical aberrations and calibration data for the HMD 118. More regarding the processing of data obtained from the imaging devices 200-1, 200-2 and/or the rotary encoder 602 is described herein.

In the examples described herein where the mirrors 202 include concave or convex mirrors, the processor may account for the concavity or convexity when orienting the mirrors 202 and/or calibrating the imaging devices 200-1, 200-2 with respect to the mirrors 202. For example, an aberration such as a spherical aberration may exist in a concave or convex mirror. The processor may analyze the aberration using geometrical optics such as ray optics, identifying the level of distortion due to the aberrations, and correct the data defining the images captured by the imaging devices 200-1, 200-2 based on the identified distortion.

Turning again to FIGS. 2 and 3, the HMD 118 may further include a number of light sources 206-1, 206-2, 206-3, . . . 206-L, where L is any integer greater than or equal to 1 (collectively referred to herein as light sources 206 unless specifically addressed otherwise). Although 18 light sources 206 are depicted in FIG. 2 and FIG. 3, any number of lights sources 206 may be included. The light sources 206 may be located along the interior portion of the front frame 120 of the HMD 118 on both eyepieces 124-1, 124-2. Further, the light sources 206 may be located at areas along the eyepieces 124-1, 124-2 between the mirrors 202 and directed toward the face 104 of the wearer 102 in order to illuminate the face 104 and the eyes 106-1, 106-2. Illumination of the face 104 and the eyes 106-1, 106-2 of the wearer 102 allows for the HMD 118 to be operable in low light or no light environments.

The electromagnetic radiation emitted by the light sources 206 may be detectable by the imaging devices 200-1, 200-2. In one example, the light sources 206 may emit a wavelength of electromagnetic radiation that in the visible, ultraviolet (UV), and/or infrared (IR) spectrums. In one example, the light sources 206 may emit wavelengths of electromagnetic radiation greater or equal to 700 nanometers including near IR and IR wavelengths. In the example where the light sources 206 emit near IR and/or IR wavelengths of electromagnetic energy, the imaging devices 200-1, 200-2 may be able to detect the emitted near IR and/or IR wavelengths of electromagnetic energy. Illumination and imaging of the eyes 106-1, 106-2 of the wearer 102 using near IR and/or IR wavelengths of electromagnetic energy allows for these non-visible wavelengths to not interfere with the vision of the wearer 102.

Figure 4:
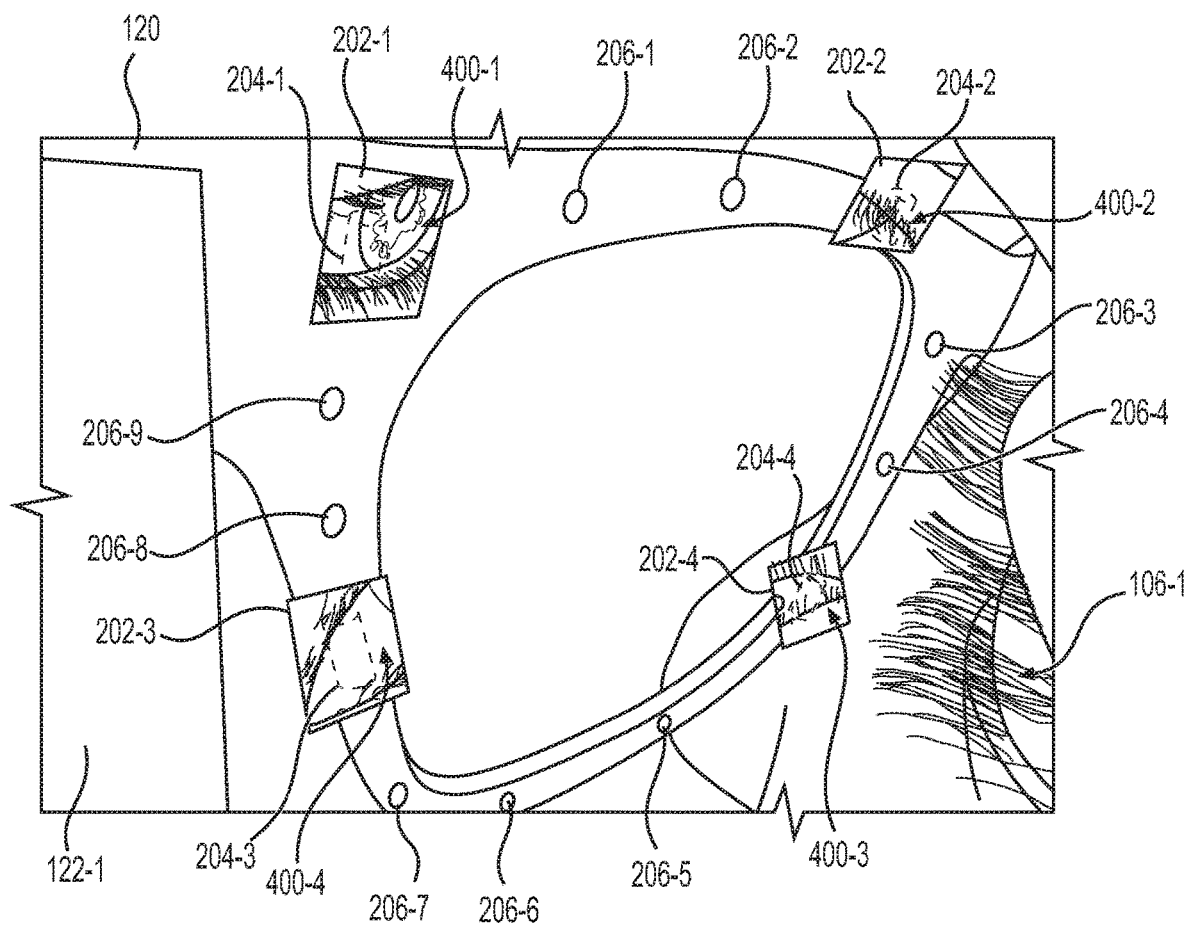
FIG. 4 illustrates a perspective view of the internal portion of the example HMD from the perspective of an imaging device including misoriented mirrors.
Figure 5:
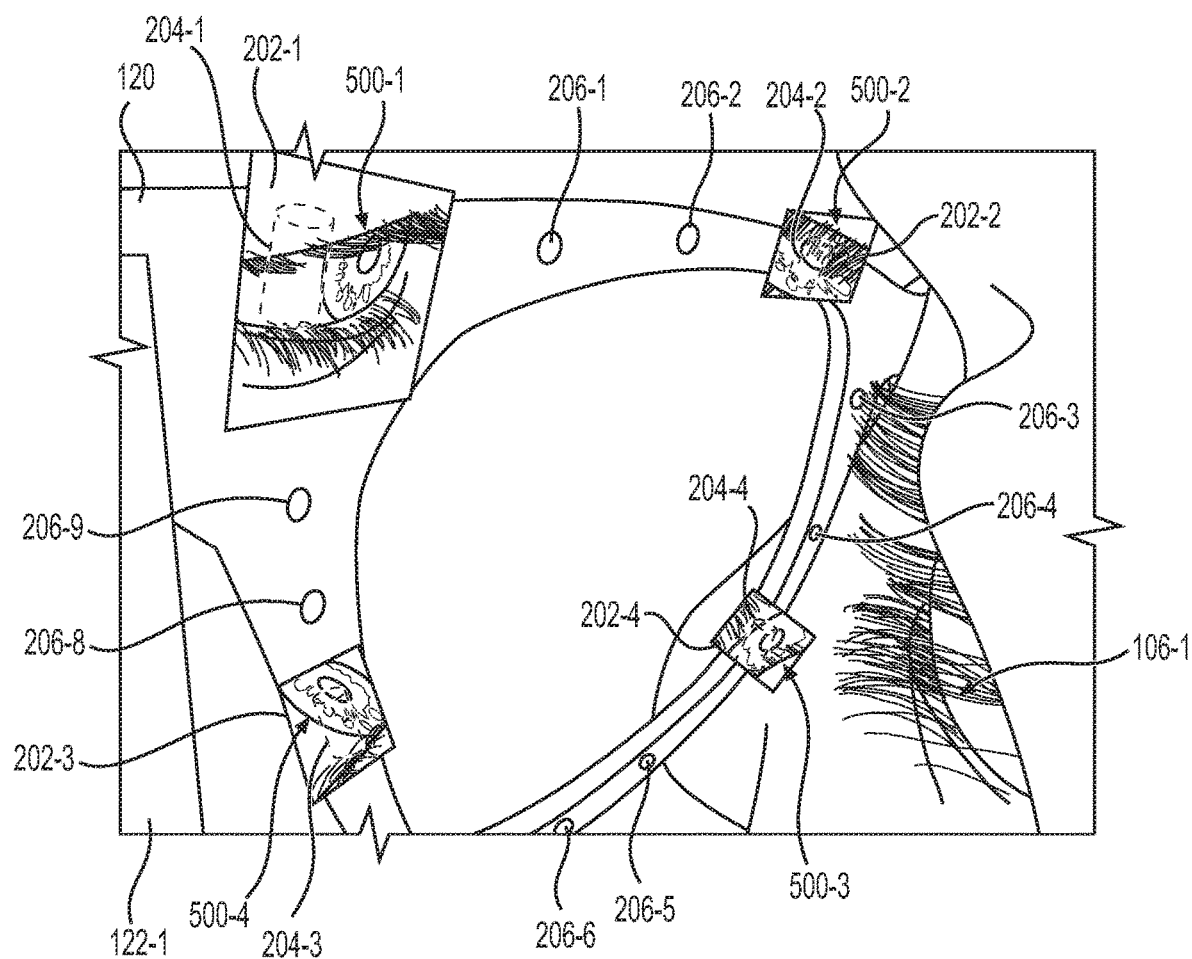
FIG. 5 illustrates a perspective view of the internal portion of the example HMD from the perspective of an imaging device including correctly oriented mirrors.

As described herein, the mirrors 202 may be aligned to reflect the eyes 106-1, 106-2 of the wearer 102 via activation of the actuators 204 as instructed by a processor. FIG. 4 illustrates a perspective view of the internal portion of the HMD 118 from the perspective of the imaging devices 200-1, 200-2 including misoriented mirrors 202, according to an example of the principles described herein. FIG. 5 illustrates a perspective view of the internal portion of the HMD 118 from the perspective of the imaging devices 200-1, 200-2 including correctly oriented mirrors 202, according to an example of the principles described herein. With continued reference to FIGS. 2 and 3 along with this description of FIGS. 4 and 5, the actuators 204 move their respective mirrors 204 in any number of coordinate directions. As described in more detail herein, the angle at which the mirrors 202 are positioned relative to the surfaces of the front frame 120 may be adjusted via activation of the actuators 204 in order to have the mirrors 202 reflect the eyes 106-1, 106-2 of the wearer 102 such that the imaging devices 200-1, 200-2 may view the eyes 106-1, 106-2 of the wearer 102 from the perspective at which the imaging devices 200-1, 200-2 are located.

In FIGS. 4 and 5, the left eyepiece 124-1 is depicted. However, description regarding the left eyepiece 124-1 applies equally to the right eyepiece 124-2. FIGS. 4 and 5 are perspective views of the HMD 118 from the perspective of the imaging devices 200-1, 200-2. Thus, the field of view of the imaging devices 200-1, 200-2 includes the internal portion of the respective eyepiece 124-1, 124-2 as well as the four mirrors 202 included on each eyepiece 124-1, 124-2. In FIG. 4, a plurality of the mirrors 202 are depicted in a misoriented manner that is not conducive to imaging the eye 106-1 of the wearer 102 via a plurality of the mirrors 202. As depicted in FIG. 4, the first mirror 202-1 is oriented such that a first image 400-1 that includes the eye 106-1 is viewable from the perspective of the imaging device 200-1. However, the second mirror 202-2, the third mirror 202-3, and the fourth mirror 202-4 are misaligned with respect to the eye 106-1 as viewed from the perspective of the imaging device 200-1 such that a first misaligned image 400-2, a second misaligned image 400-3, and a third misaligned image 400-4 are reflected by the respective mirrors 202-2, 202-3, 202-4. As depicted in FIG. 4, the mirrors 202-2, 202-3, 202-4 may be reflecting portions of the face 104 of the wearer 102 around the eye 106-1 and/or limited portions of the eye 106-1 that do not include enough of the eye 106-1 to allow for gaze tracking and/or biometric authentication. Further, the misalignment of the mirrors 202-2, 202-3, 202-4 in this manner results in an inability to utilize multiple, reflected images of the eye 106-1 in the gaze tracking and/or biometric authentication processes described herein.

A processor, after receiving data from the imaging device 200-1 defining the image captured at FIG. 4, may identify that one or more of the mirrors 202-2, 202-3, 202-4 are misaligned. In one example, the processor may execute computer-executable instructions stored on a computer-readable medium such as an eye detection component to determine if an image of the eye 106-1 of the wearer 102 is included in the reflections of the mirrors 202-2, 202-3, 202-4. In response to a determination that the eye 106-1 of the wearer 102 is included in the reflections of the mirrors 202-1, 202-2, 202-3, 202-4 as is the case with the mirror 202, no action is taken including activation of the first actuator 204-1 mechanically coupled between the front frame 120 and the first mirror 202-1.

In response to a determination that the eye 106-1 of the wearer 102 is not included in the reflections of the mirrors 202-1, 202-2, 202-3, 202-4 as is the case with mirrors 202-2, 202-3, 202-4 as depicted in FIG. 4, the processor may instruct the actuators 204-2, 204-3, 204-4 mechanically coupled between the front frame 120 and the mirrors 202-2, 202-3, 202-4, respectively, to orient the mirrors 202-2, 202-3, 202-4 until the eye 106-1 of the wearer 102 is detected by the imaging device 200-1 and the processor. During orienting the mirrors 202-2, 202-3, 202-4, the imaging device 200-1 may capture at least one additional image or frame of video to continually determine whether the eye 106-1 of the wearer 102 is or is not included in the reflections of the mirrors 202-2, 202-3, 202-4. In this manner, a feedback loop may be formed by iteratively detecting whether one or more of the mirrors 202 are misaligned based on the detection of the eye 106-1 of the wearer 102 and moving of the mirrors 202 via activation of the actuators 204. This feedback loop may end when it is determined that the eye 106-1 is reflected in the mirrors 202.

With reference to FIG. 5, the above processing and activation of the actuators 204-2, 204-3, 204-4 results in correctly orienting the mirrors 202-2, 202-3, 202-4 such that the eye 106-1 is viewable in the mirrors 202-2, 202-3, 202-4 with respect to a perspective of the imaging device 200-1. For example, the second mirror 202-2 may be moved by the second actuator 204-2 such that a second image of the eye 500-2 is captured. Similarly, the third mirror 202-3 may be moved by the third actuator 204-3 such that a third image of the eye 500-4 is captured. Further, the fourth mirror 202-4 may be moved by the fourth actuator 204-4 such that a third image of the eye 500-3 is captured.

In this manner, along with a first image 500-1 of the eye, a plurality of images 500-1, 500-2, 500-3, 500-4 of the eye 106-1 may be obtained from a plurality of different perspectives or angles. For example, the first mirror 202-1 may provide an image of the eye 106-1 from a first angle above and to the right of the eye 106-1 of the wearer 102 as viewed from the perspective depicted in FIG. 1. Similarly, the second mirror 202-2 may provide an image of the eye 106-1 from a second angle above and to the left of the eye 106-1 of the wearer 102 as viewed from the perspective depicted in FIG. 1. Further, the third mirror 202-3 may provide an image of the eye 106-1 from a third angle below and to the right of the eye 106-1 of the wearer 102 as viewed from the perspective depicted in FIG. 1. Still further, the fourth mirror 202-4 may provide an image of the eye 106-1 from a fourth angle below and to the left of the eye 106-1 of the wearer 102 as viewed from the perspective depicted in FIG. 1. The multiple angles of the image of the eye 106-1 provides for more accurate and precise tracking of the pupils 112-1, 112-2 and irises 114-1, 114-2 of the wearer 102 for gaze tracking purposes. Further, the multiple angles of the image of the eye 106-1 allows for more accurate and precise image of the irises 114-1, 114-2 of the wearer 102 for the purposes of authenticating the wearer 102.

Figure 8:
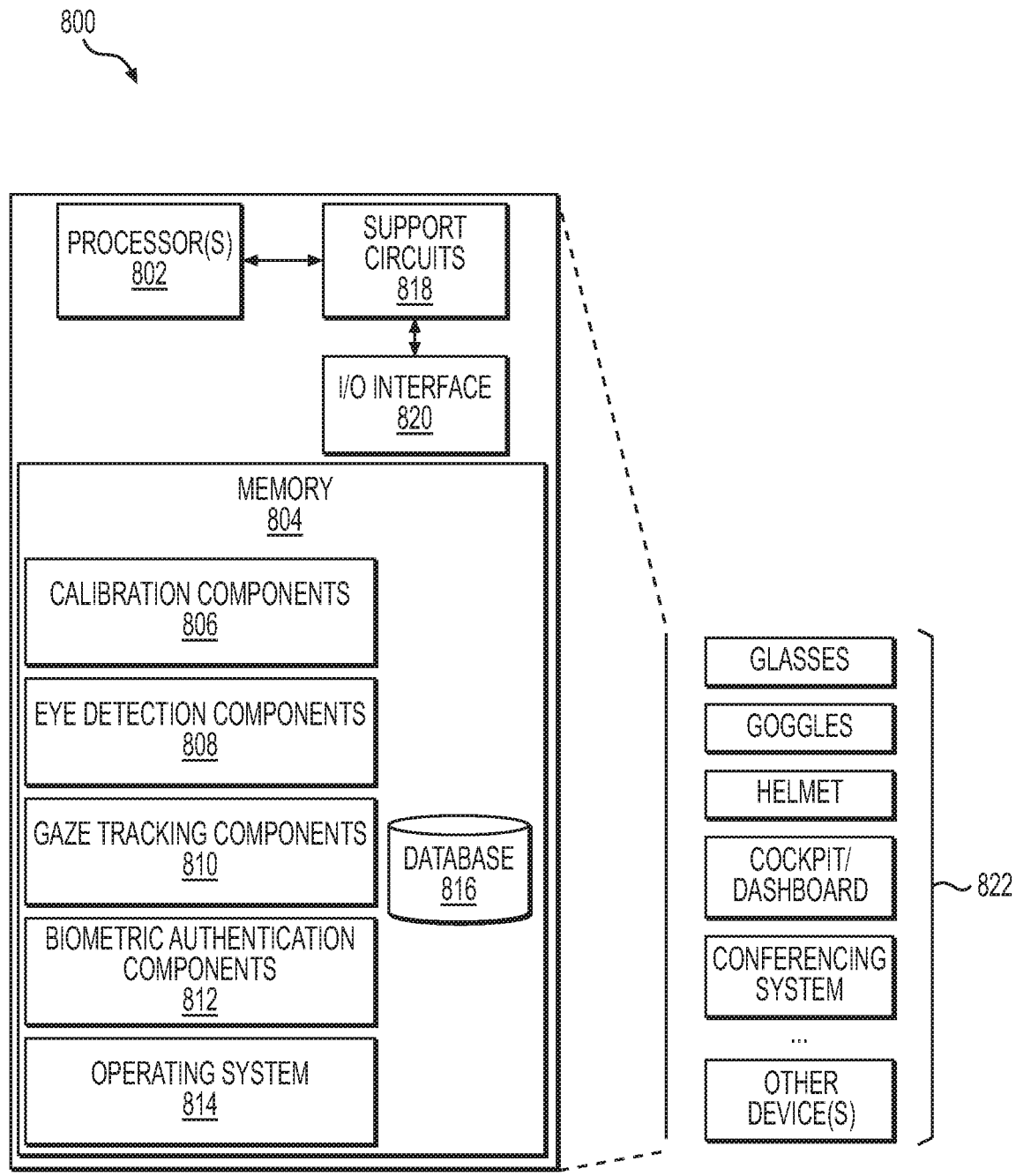
FIG. 8 is a schematic diagram of an example HMD, such as the example MID of FIG. 1.

FIG. 8 is a schematic diagram of an example device, such as HMD 118 of FIG. 1, usable to implement the techniques described herein. FIG. 8 depicts a computer system 800 of the HMD 118 for implementing the examples described herein. The computer system 800 may be included in a number of form factors and types of devices including, for example, glasses as depicted in FIGS. 1 through 7, goggles, a helmet, a cockpit, a dashboard, a conferencing system including a teleconferencing system, a hat, a heads-up display (HUD), a headset, and other devices as depicted by element 822 in FIG. 8.

The computer system 800 includes one or more processors 802, various support circuits 818, and memory 804. The processor 802 may include any data processing device capable of executing the processes and methods described herein. Although one processor 802 is depicted in FIG. 8, a number of processors may be included and used to perform the functions described herein. In one example, the processor 802 may include a reduced instruction set computer (RISC) processing device. A RISC processing device is any processing device capable of executing a RISC computer instruction set to allow fewer cycles per instruction relative to, for example, a complex instruction set computer (CISC). A RISC instruction set is optimized for a highly regular instruction pipeline flow and includes access to memory through specific instructions rather than as a part of most instructions.

Further, the processor(s) 802 may include one or more central processing units (CPUs) and/or graphics processing units (GPUs) configured for parallel processing. Some or all of the functionality shown in FIG. 8 may be implemented on the HMD 118 and/or may be implemented on a remote computing device that is in communication with the HMD 118 via one or more wired or wireless networks.

The support circuits 818 for the processor 802 may include a cache, power supplies, clock circuits, data registers, and an input/output (I/O) interface 820, among other support circuits. The I/O interface 820 may be directly coupled to the memory 804 or coupled through the support circuits 818 as depicted in FIG. 8. The I/O interface 820 may also be configured for communication with input devices and/or output devices such as network devices, data storage devices, AR and VR servers, mouse, keyboards, display devices, video and audio sensors, and imaging devices, among other I/O devices. Still further, the I/O interface 820 may also be communicatively coupled to the imaging device 200-1, 200-2, the actuators 204, the rotary encoder 602 among and other elements of the HMD 118 in order to send and receive instructions and data to and from the processor 802. The support circuits 818 may include one or more application specific integrated circuits (ASICs), field programmable gate arrays (FPGAs), or other hardware devices. Thus, while the components 806, 808, 810, 812, 814 are depicted in FIG. 8 as being stored in the memory 804. In one example, the functionality of any or all of the components 806, 808, 810, 812, 814 may be implemented in hardware in an ASIC or FPGA. The use of an ASIC or a FPGA may provide for processor-intensive operations like facial recognition, biometric authentication, and other processes to be implemented in hardware and in a faster manner and may reduce the burden on other processing devices such as the processor(s) 802.

For example, with the computer system 800 being included within the HMD 118, I/O interfaces 820 may be directly coupled to the memory 804 and/or coupled through the support circuits 818 to allow for data to be transferred between the HMD 118 and an external computing system or device. In this example, the I/O interfaces 820 may include wireless communication devices such as a near-field communication (NFC) device, a radio-frequency identification (RFID) device, a Bluetooth™ wireless communication enabled device, a Wi-Fi™ wireless communication enabled device, WiMAX™ wireless broadband communication enabled device, and satellite communication enabled devices, among other communication devices.

In one example, one or more components 806, 808, 810, 812, 814 such as software applications or apps may be configured to access the imaging device 200-1, 200-2, the light sources 206, and/or wireless communication devices to accomplish the examples described herein. In these examples, the components 806, 808, 810, 812, 814 may receive data such as image data from the imaging device 200-1, 200-2 and signals representing an angular position provided by the rotary encoder 602 via the I/O interface 820. The I/O interface 820 may transmit the data via the support circuits 818 to the memory 804 executing computer-executable instructions and/or to the processor 802 for further processing. The components 806, 808, 810, 812, 814 may include the calibration component 806, the eye detection component 808, the gaze tracking component 810, and the biometric authentication component 812. The components 806, 808, 810, 812, 814 include computer-readable and/or computer executable instructions that may be executed to perform the functions as described herein. In one example, the computer-readable and/or computer executable instructions that may be executed by the processor(s) 802. In one example, the instructions may be encoded in hardware such as an ASIC or FPGA.

The calibration component 806 may include computer-readable and/or computer executable instructions that, when executed by the processor 802, may calibrate the spatial relationship of the imaging devices 200-1, 200-2 with respect to the mirrors 202. As described herein, calibration may include capturing images of the mirrors 202 using the imaging devices 200-1, 200-2, and determining a spatial relationship based on distortion of the fiducials 208 and/or signals received from the rotary encoder 602 defining angular position of the imaging devices 200-1, 200-2 (coupled to the arms 122-1, 122-2) relative to the mirrors 202 (coupled to the front frame 120).

The eye detection component 808 may include computer-readable and/or computer executable instructions that, when executed by the processor 802, may assist in adjusting the angle of reflection of the mirrors 202 in order to reflect images of the wearer's eyes 106-1, 106-2 in the mirrors 202 from the perspective of the imaging devices 200-1, 200-2. The eye detection component 808 may iteratively cause the imaging devices 200-1, 200-2 to capture images of the mirrors 202, detecting whether the eyes 106-1, 106-2 of the wearer 102 are detected in the captured images of the mirrors 202, and adjusting the angle of the mirrors 202 (whether manually or via instructing the actuators 204) until the eyes 106-1, 106-2 of the wearer 102 are detected in the captured images of the mirrors 202. The processing performed by execution of the eye detection component 808 may be performed any number of iterations. Further, the eye detection component 808 may be executed by the processor 802 at any time throughout the use of the HMD 118 by the wearer 102 such as once when the HMD 118 is first worn by the wearer 102, periodically throughout use of the HMD 118, and continually throughout use of the HMD 118.

The gaze tracking component 810 may include computer-readable and/or computer executable instructions that, when executed by the processor 802, may cause the eyes 106-1, 106-2 of the wearer 102 to be tracked. Tracking the gaze of the wearer 102 may include capturing an image of the eyes 106-1, 106-2 of the wearer 102 as reflected in the mirrors 202 by the imaging devices 200-1, 200-2. In one example, the image may include a plurality of images and/or a continuous video stream of images. Further, the images may be acquired continuously in real-time recording the movement of the eyes 106-1, 106-2 of the wearer 102. Tracking the gaze of the wearer 102 may also include acquiring an image of the eyes 106-1, 106-2 in real-time by deriving images of the eyes 106-1, 106-2 from the captured images. The image of the eyes 106-1, 106-2 is analyzed to generate gaze direction information generated based upon the locations of, for example, the pupils 112-1, 112-2 within the eye image. For example, if the pupils 112-1, 112-2 are located in the center of the eye image, this position may correlate to a straight forward gazing direction. Alternatively, if the pupils 112-1, 112-2 are located at the center bottom of the eye image, this position may correlate to a straight down gazing direction. In one example, a linear regression function or other variance analysis may be applied to the different images of the eyes 106-1, 106-2 obtained from the different mirrors 202 to minimize errors in the eye tracking processes. In another example where IR or near-IR wavelengths of light are emitted by the light sources 206, a glint of the IR or near-IR wavelengths of light are reflected from the eyes 106-1, 106-2 and captured by the imaging devices 200-1, 200-2 as reflected by the mirrors 202. In this example, the light sources 206 produce glints on the cornea surface of the eyes 106-1, 106-2 of the wearer 102, and the imaging devices 200-1, 200-2 capture images and/or videos of the eye region. The gaze is estimated from the relative movement between the pupil center and glint positions. The light sources 206 emitting IR or near-IR wavelengths of light are used to achieve better contrast and avoid effects due to variations induced by natural light.

Data defining the gaze direction of the wearer 102 may be stored in, for example, the memory 804. Gaze tracking may be used in applications such as, for example, human attention analysis and human cognitive state analysis as well as in connection with gaze-based interactive user interfaces and gaze contingent graphical displays.

The biometric authentication component 812 may include computer-readable and/or computer executable instructions that, when executed by the processor 802, may be used to authenticate the wearer 102 to access a place or thing. For example, the biometric authentication component 812 may be used to authenticate the wearer 102 to access the HMD 118 itself. In another example, the biometric authentication component 812 may be used to authenticate the wearer 102 to access an area such as a facility. In another example, the biometric authentication component 812 may be used to authenticate the wearer 102 to access another device or system. In some examples, the biometric authentication component 812 may send data relating to the authentication of the wearer 102 to the other devices and systems to acknowledge access to the other devices and systems and/or the area. The present biometric authentication processes may be used to provide access to the wearer 102 in other scenarios as well. In one example, image stitching processing, image data fusion processing, and other image data processing may be performed when analyzing the different images of the eyes 106-1, 106-2 obtained from the different mirrors 202 in order to obtain the more accurate and precise image of the iris(es) 114-1, 114-2 of the eye(s) 106-1, 106-2 of the wearer 120.

The processor 802, executing the biometric authentication component 812, may capture at least one image of the mirrors 202 reflecting the eyes 106-1, 106-2 of the wearer 102. The biometric authentication component 812 may cause a segmentation process to be performed on the captured images to segment the iris(es) 114-1, 114-2 of the eye(s) 106-1, 106-2 of the wearer 102 from the sclera 116-1, 116-2 and the pupil(s) 112-1, 112-2. An iris code may be extracted from the segmented iris(es) 114-1, 114-2. In one example, the iris code may be enrolled as an iris code template and stored in, for example, the database 816 to authenticate the wearer 102. In one example, the extracted iris code may be used to authenticate the wearer 102 to the HMD 118. The iris code may be matched against one or more iris code templates stored in the database 816 maintained by, or accessible to, the HMD 118. If a match between the iris code and a particular iris code template stored in the database 816 is found, then access to the HMD 118 may be granted. However, if the iris code does not match any iris code template stored in the database 816, then access to the HMD 118 may be denied. In this manner, the biometric authentication component 812, may authenticate the wearer 102.

The processor 802, executing the components 806, 808, 810, 812, may perform any of the processes and methods described herein, and transmit the results within the HMD 118 and to devices or systems external to the HMD 118. In one example, the processor 802 may transmit data to the memory 804, the support circuits 818, the I/O interfaces 820, the imaging devices 200-1, 200-2, the actuators 204, the light sources 206, and/or the rotary encoder 602. In this example, the data may represent operating instructions to the memory 804, the support circuits 818, the I/O interfaces 820, the imaging devices 200-1, 200-2, the actuators 204, the light sources 206, and/or the rotary encoder 602 to perform their respective functions. Further, in one example, the processor 802 may receive data from the memory 804, the support circuits 818, the I/O interfaces 820, the imaging devices 200-1, 200-2, the actuators 204, the light sources 206, and/or the rotary encoder 602. In this example, the data may include data defining detected events or changes in the functioning of the HMD 118 an/or confirmation of a state of operation of the above-listed devices. The transmission of date between the processor 802, the memory 804, the support circuits 818, the I/O interfaces 820, the imaging devices 200-1, 200-2, the actuators 204, the light sources 206, and/or the rotary encoder 602 may be performed using wired or wireless communication pathways and protocols. Further, the processes and methods described herein may be performed by the processor 802. In this example, the processor may both execute the components 806, 808, 810, 812 as well as process the results of the components 806, 808, 810, 812. Any data obtained from the execution of the components 806, 810, 812 may be stored in the memory 804 and/or the database 816 included within the memory 804.

In one example, data may be transmitted between the devices of the HMD 118 and external devices and systems. The transmission of data between the HMD 118 and the external devices and systems may be performed via, for example, wired or wireless communications. In one example, the data may be transmitted via wireless communication to a server and/or an additional wireless communication device to authenticate a user of the HMD 118. In one example, data obtained and/or processed by the processor 802, the memory 804, the support circuits 818, the I/O interfaces 820, the imaging devices 200-1, 200-2, the actuators 204, the light sources 206, and/or the rotary encoder 602 may be transmitted to the external devices and systems for further processing and/or storage in an external data storage device.

The memory 804, comprises one or more non-transitory computer readable media, and stores processor-executable instructions and/or data that may be executed by and/or used by the processor(s) 802. These processor-executable instructions may include firmware, software, apps, and combinations thereof. The components 806, 808, 810, 812 including processor-executable instructions that are stored in the memory 804 include the calibration component 806, the eye detection component 808, the gaze tracking component 810, and the biometric authentication component 812. The memory 804 may further include a database 816, though the database 816 need not be in the same physical memory 804 as the components 806, 808, 810, 812. The database 816 may be remotely accessed by the components 806, 808, 810, 812 via a cloud service. Additionally, the components 806, 808, 810, 812 may also include several components that may not be co-located on the memory 804.

The computer system 800 of the HMD 118 may be programmed with one or more operating systems (OS) 814. By way of example and not limitation, the OS 814 may include computer-readable and/or computer executable instructions that, when executed by the processor(s) 802, may manage hardware, software resources, and provide common services for the HMD 118. The OS 814 may include, by way of example and not limitation, those available from Oracle, Microsoft, Apple, Alphabet, Linux, or the like. At least a portion of the OS 814 may be disposed in the memory 804.

The memory 804 may include one or more of random-access memory (RAM), read only memory (ROM), a magneto-resistive read/write memory, an optical read/write memory, a cache memory, and a magnetic read/write memory, among other types of volatile and non-volatile memory devices.

The computer system 800 of the HMD 118 may be communicatively coupled to any device within or external to the HMD 118. For example, the processor 802 may be communicatively coupled to the imaging devices 200-1, 200-2, the actuators 204, the rotary encoder 602, and other devices of the HMD 118 described herein in order to send instructions to and receive data from these devices. Further, the processor 802 may be communicatively coupled to devices and systems external to the HMD 118 such as, for example, a mobile device such as a cellular phone or tablet device, a wearable computing device such as a smart watch, a vehicle, a home security system, and an internet-of-things (IOT) network, among a myriad of other devices and systems. In this example, the processor 802 being communicatively coupled to devices and systems external to the HMD 118 may allow for the HMD 118 to be used to access these devices and systems though the biometric authentication processes provided via the HMD 118. In this example, authentication of the wearer 102 via the HMD 118 and the execution of the biometric authentication component 812 may be used by these devices and systems external to the HMD 118 as authentication to access the devices and systems external to the HMD 118. In another example, the processor 802 being communicatively coupled to devices and systems external to the HMD 118 may allow the wearer 102 to interact with the devices and systems. For example, the gaze tracking of the wearer 102 via the HMD 118 and the execution of the gaze tracking component 810 may be used by these devices and systems external to the HMD 118 as input to the devices and systems external to the HMD 118 or otherwise allow the wearer 102 to interact with the devices and systems external to the HMD 118. In interacting with devices internal and external to the HMD 118, the computing device 118 may include and utilize one or more communication elements or networking sub-systems, such as wired and/or wireless communication systems and networks. Further, the computing device 118 of the HMD 118 may communicate via a network, such as the Internet.

In one example, the HMD 118 may include at least one input element able to receive input from a user such as, for example, a push button, touch pad, touchscreen, wheel, joystick, keyboard, mouse, keypad, or any other such component or element whereby a user can input a command to the computing device 118 of the HMD 118. In one example, the computing device 118 of the HMD 118 may be controlled through a combination of visual and audio commands, such that a wearer 102 may control the computing device 118 of the HMD 118 without having to further interact with or physically touch the computing device 118 of the HMD 118.

Figure 9:
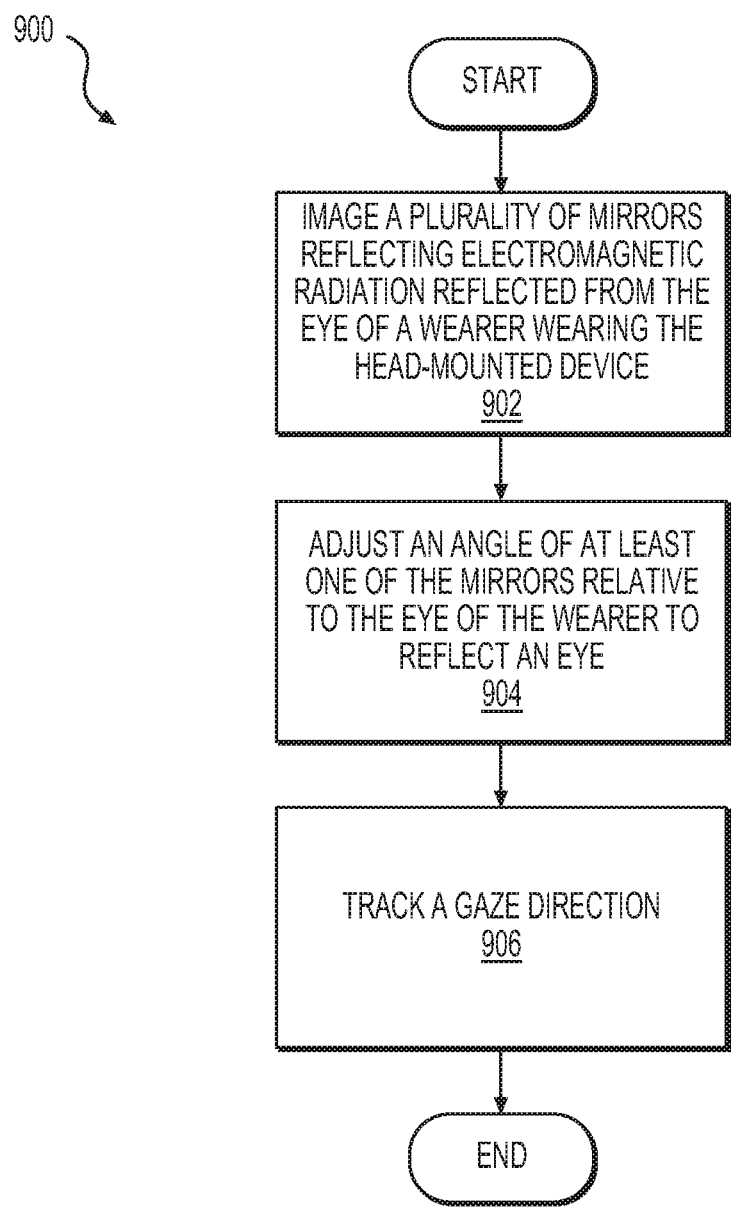
FIG. 9 is a flowchart showing an example method of acquiring an image of an eye from multiple perspectives.

FIG. 9 is a flowchart showing a method 900 of imaging an eye 106-1, 106-2, according to an example of the principles described herein. At block 902, the method 900 of FIG. 9 may include capturing, with an imaging device 200-1, 200-2, an image of a plurality of mirrors 202 coupled to an interior portion of the front frame 120 of the HMD 118. The plurality of mirrors 202 reflect electromagnetic radiation that is, in turn, reflected from the eye of a wearer of the HMD 118 such that an image of the eyes 106-1, 106-2 of the wearer 102 may be captured as reflected by the mirrors 202. The light sources 206 may illuminate the face 104 and eyes 106-1, 106-2 of the wearer 102 such that the electromagnetic waves may reflect from the face 104 and eyes 106-1, 106-2 and, in turn, reflected by the mirrors 202 and captured by the imaging devices 200-1, 200-2.

The method 900, at block 904, may also include adjusting, with a mirror angle adjustment device such as the actuators 204, an angle of at least one of the mirrors 202 relative to the eye 106-1, 106-2 of the wearer 102 to align the at least one mirror to reflect the eye 106-1, 106-2 or an image of the eye 106-1, 106-2 to the imaging device 200-1, 200-2. In one example, the mirror angle adjustment device may include the actuators 204 mechanically coupled to the mirrors 202 as described herein. In another example, the mirror angle adjustment device may include a manually-adjustable ball-and-socket joint coupling the mirrors 202 to the front frame 120. In this example, the wearer 102 or another individual may manually adjust the angle of the mirrors 202. Whether moved by the wearer 102 manually or autonomously via the actuators 204, the mirrors 202 are angled such that the eyes 106-1, 106-2 are captured by the imaging devices 200-1, 200-2. Thus, at block 904, the imaging devices 200-1, 200-2 capture an image of the mirrors 202 as depicted in FIG. 4, and at block 904, the imaging devices 200-1, 200-2 capture an image of the mirrors 202 as depicted in FIG. 5. The processing at blocks 904 and 904 may be performed any number of iterations such that the eyes 106-1, 106-2 are reflected by the mirrors 202 and viewable from the perspective of the imaging devices 200-1, 200-2. This allows the imaging devices 200-1, 200-2 to capture images of the eyes 106-1, 106-2 as reflected from the plurality of mirrors 202.

At block 906, the method 900 may further include tracking, based at least in part on the image of the eye and via the gaze tracking component 810, a gaze direction of the pupil(s) 112-1, 112-2 of the wearer 102. The tracking of the gaze direction of the wearer 102 may be used for any number of purposes including, for example, human-computer interaction (HCI), marketing research, human activity recognition, gaming, and human vehicle driving applications, among many other applications.

Figure 10:
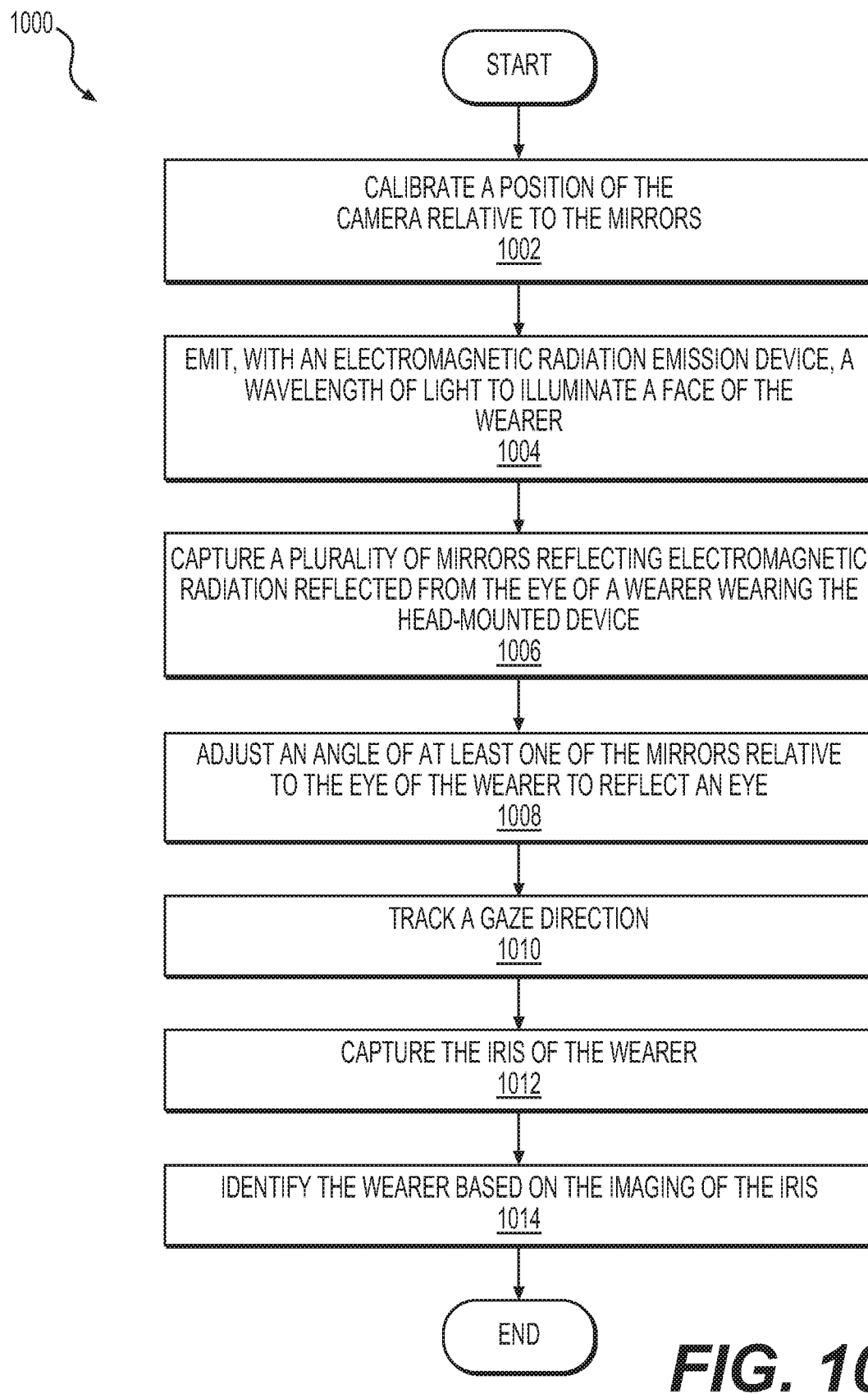
FIG. 10 is a flowchart showing another example method of acquiring an image of an eye from multiple perspectives.

FIG. 10 is a flowchart showing a method 1000 of imaging an eye 106-1, 106-2, according to an example of the principles described herein. The method 1000 may include, at block 1002, calibrating the position of the imaging devices 200-1, 200-2 relative to the mirrors 202. The calibration component 806, when executed by the processor 802, may perform the calibration of the position of the imaging devices 200-1, 200-2 relative to the mirrors 202. As described herein, the position of the imaging devices 200-1, 200-2 relative to the mirrors 202 may change due to the deflection of the arms 122-1, 122-2, the rotation of the arms 122-1, 122-2 about the hinge 600 coupled between the front frame 120 and the arms 122-1, 122-2, among other reasons. In one example, the calibration of block 1002 may be performed when the wearer 102 places the HMD 118 on their face 104, when the rotary encoder 602 and/or the imaging devices 200-1, 200-2 sense a change in the relative position of the mirrors 202 with respect to the imaging devices 200-1, 200-2, periodically throughout the use of the HMD 118, continually throughout the use of the HMD 118, and combinations thereof. The fiducials 208 may be used to assist in the calibration process of block 1002 as described herein.

At block 1004, the processor 802 may instruct at least one of the light sources 206 to emit a wavelength of electromagnetic radiation to illuminate the face 104 of the wearer. The electromagnetic radiation emitted by the light sources 206 may be of any wavelength of electromagnetic radiation that the imaging devices 200-1, 200-2 can detect including, for example, wavelengths of electromagnetic radiation that in the visible, ultraviolet (UV), and/or infrared (IR) spectrums.

A plurality of mirrors 202 may be imaged at block 1006 using the imaging devices 200-1, 200-2. The mirrors 202 reflect electromagnetic radiation reflected from the eyes 106-1, 106-2 of the wearer 102 wearing the HMD 118. In the examples described herein, the imaging devices 200-1, 200-2 may include a field of view large enough to capture an image of at least two of their respective mirrors 202 simultaneously in the same image. In one example, the imaging devices 200-1, 200-2 may include a field of view large enough to capture an image of all of their respective mirrors 202 simultaneously in the same image including the four mirrors 202 included for the respective eyepieces 124-1, 124-2.

At block 1008, an angle of at least one of the mirrors 202 may be adjusted relative to the eyes 106-1, 106-2 of the wearer 102 to reflect an iris 114-1, 114-2 and/or a pupil 112-1, 112-2 of the wearer 102. The adjustment of the angles of the mirrors 202 may be performed manually or via the processor 802 activating the actuators 204 associated with the mirrors 202. As described herein, the mirrors 202 may not be aligned relative to the eyes 106-1, 106-2 of the wearer 102 and the imaging devices 200-1, 200-2 such that the eyes 106-1, 106-2 of the wearer 102 are imageable by the imaging devices 200-1, 200-2. The angles of the mirrors 202 may not initially reflect the eyes 106-1, 106-2 of the wearer 102 from the perspective of the imaging devices 200-1, 200-2 due to the position of the eyes 106-1, 106-2 of the wearer 102 on the face 104 of the wearer 102, the manner in which the HMD 118 sits on the face 104 of the wearer 102, and other anatomical features of the face 104 of the wearer 102. Blocks 1006 and 1008 may be performed any number of iterations in order to reflectively align the eyes 106-1, 106-2 of the wearer 102 with the imaging devices 200-1, 200-2. Further, in one example, the eye detection component 808 may be executed by the processor 802 in order to detect the eyes 106-1, 106-2 of the wearer 102 during the number of iterations of blocks 1006 and 1008.

At block 1010, the method 1000 may further include tracking, with the processor 802 executing the gaze tracking component 810, a gaze direction of the pupil(s) 112-1, 112-2 of the wearer 102. Further, at block 1012, the processor 802, an image of the iris 114-1, 114-2 of the eyes 106-1, 106-2 of the wearer 102 may be captured using the imaging devices 200-1, 200-2 for biometric authentication purposes. At block 1014, the biometric authentication component 812, when executed by the processor 802, may authenticate the wearer 102 based on the image of the iris 114-1, 114-2 of the eyes 106-1, 106-2 of the wearer 102. As described herein, an iris code may be extracted from the iris 114-1, 114-2 of the wearer 102 as imaged by the imaging devices 200-1, 200-2, and the iris code may be compared to data representing the iris codes of authenticated individuals stored in the database 816. Thus, the method 1000 of FIG. 10 provides for both gaze tracking and biometric authentication as described herein.

EXAMPLE CLAUSES

A head-mounted device comprises a frame, a plurality of mirrors coupled to an interior portion of the frame, an imaging device coupled to the frame at a position to capture images of an eye of a wearer reflected from the mirrors, and a mirror angle adjustment device to adjust an angle of at least one of the mirrors relative to the imaging device so that the at least one mirror reflects the eye of the wearer to the imaging device. The plurality of mirrors are disposed within a field of view of the imaging device such that the imaging device simultaneously captures images of the eye reflected from the plurality of mirrors. The mirror angle adjustment device includes an actuator coupled to the at least one of the mirrors, wherein the angle of the at least one of the mirrors is based on the position of the eye of the wearer relative to the imaging device.

The head-mounted device further comprises at least one light source coupled to the interior portion of the frame to illuminate the eye of the wearer, wherein the imaging device is configured to detect a wavelength of electromagnetic radiation emitted by the light source. The head-mounted device further comprises a first arm coupled to a first side of the frame, and a second arm coupled to a second side of the frame. The frame includes a first eyepiece, and a second eyepiece coupled to the first eyepiece via a bridge. The plurality of mirrors include a first group of mirrors coupled to a first interior portion of the first eyepiece, and a second group of mirrors coupled to a second interior portion of the second eyepiece. The imaging device is a first imaging device and is coupled to the first arm and oriented to capture the first group of mirrors, and the head-mounted device further comprises a second imaging device coupled to the second arm and oriented to capture the second group of mirrors.

The head-mounted device further comprises one or more processors, and memory communicatively coupled to the one or more processors, the memory storing instructions that, when executed by the one or more processors, configures the head-mounted device to perform operations comprising controlling the mirror angle adjustment device to adjust the angle of at least one of the mirrors based on images captured by the imaging device.

A device comprises a front frame, a plurality of mirrors coupled to an interior portion of the front frame to reflect an image of an eye of a user of the device, an arm coupled to the front frame, an imaging device coupled to the arm at a position to capture images reflected from the mirrors, and a light source coupled to the interior portion of the front frame to illuminate the eye of the user.

The light source emits electromagnetic radiation having a wavelength of at least 700 nanometers. The imaging device is positioned to simultaneously capture an image of the plurality of mirrors. The arm is pivotably coupled to the front frame. The device further comprises a sensor to detect a rotational angle of the arm relative to the front frame, and a processor to calibrate the images captured by the imaging device based on the rotational angle detected by the sensor.

The device further comprises a fiducial positioned on at least one mirror of the plurality of mirrors and detectable by the imaging device, and a processor to calibrate the images captured by the imaging device based on the fiducial, the fiducial identifying a location of the imaging device with respect to the at least one mirror. The device further comprises a mirror angle adjustment device to adjust an angle of at least one mirror of the plurality of mirrors relative to the imaging device so that the at least one mirror reflects an image of the eye of the user to the imaging device.

The mirror angle adjustment device includes an actuator. The device further comprises one or more processors, and memory storing instructions that, when executed by the one or more processors, causes the device to perform operations comprising tracking a gaze direction of the eye, and controlling, based at least in part on the gaze direction, the actuator to adjust an angle of the at least one mirror relative to the eye of the user to reflect an image of the eye to the imaging device.

A method comprises capturing, with an imaging device, an image of a plurality of mirrors coupled to a frame of a device, the plurality of mirrors reflecting an image of an eye of a user of the device. The method also comprises adjusting, with a mirror angle adjustment device, an angle of at least one mirror of the plurality of mirrors relative to the eye of the user to align the at least one mirror to reflect the image of the eye to the imaging device, and tracking, based at least in part on the image of the eye, a gaze direction of the user. Adjusting the angle of the at least one mirror includes calibrating the angle of the at least one mirror based on at least one characteristic of an anatomy of the user.

The image of the plurality of mirrors includes a reflection of the eye from multiple different angles. The method further comprises identifying, with a biometric authentication component, the user based on the reflection of the eye from the multiple different angles. The method further comprises determining a position of the imaging device relative to the plurality of mirrors. The tracking the gaze direction is based at least in part on the position of the imaging device relative to the plurality of mirrors. The method further comprising emitting, with a light source, electromagnetic radiation to illuminate the eye of the user.

INDUSTRIAL APPLICABILITY

The systems and methods described herein provide for a head-mounted device capable of detecting the eye gaze of a user wearing the head-mounted device and to biometrically authorize the wearer using a plurality of mirrors and an imaging device directed at the plurality of mirrors. Implementation of a single camera to capture reflected images from a plurality of mirrors provides for a lower-cost eye gaze tracking and biometric authentication system. Further, the single camera capturing reflected images from the plurality of mirrors eliminates any calibrations or calculations that may otherwise take place between multiple imaging devices. Still further, the ability to capture an image of the eye of the user from a plurality of different angles as provided by the plurality of mirrors allows for a more accurate eye gaze detection since detecting the eye gaze from a single angle may allow for occlusions between the eye, the mirror, and the imaging device to have a more significant effect on accuracy. However, with a plurality of mirrors, any effect of such occlusion may be significantly reduced or eliminated since the different angles may provide for at least one non-occluded image. Even still further, the eye gaze of a user may be determined with a high level of accuracy due to the ability of the imaging device to triangulate the location of, for example, the iris of the user's eye.

With the high level of accuracy of eye imaging provided by the systems and methods described herein, the ability for the head-mounted device to detect, for example, an iris of the user for biometric identification or authentication of the user is provided. Further, the high level of accuracy of eye imaging provided by the systems and methods described herein provides for an ability to detect a gaze direction of the user in a very high degree of accuracy.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware such as ASICs, FPGAs, or the like.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing components, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A head-mounted device comprising:
    a plurality of mirrors coupled to an interior portion of a frame;
    a first imaging device coupled to the frame at a position to capture images of the plurality of mirrors; and
    a mirror angle adjustment device to adjust an angle of at least one of the plurality of mirrors relative to the first imaging device so that the at least one of the plurality of mirrors reflects a first eye to the first imaging device,
    wherein the plurality of mirrors are disposed within a field of view of the first imaging device such that the first imaging device captures images of the plurality of mirrors, the plurality of mirrors each directly reflecting the first eye.

2. The head-mounted device of claim 1, wherein the plurality of mirrors include:
    a first mirror to reflect the first eye from a first perspective; and
    a second mirror to reflect the first eye from a second perspective.

3. The head-mounted device of claim 1, wherein the mirror angle adjustment device includes an actuator coupled to the at least one of the plurality of mirrors, wherein the angle of the at least one of the plurality of mirrors is based on the position of the first eye of a user relative to the first imaging device.

4. The head-mounted device of claim 1, further comprising at least one light source coupled to the interior portion of the frame to illuminate the first eye of a user, wherein the first imaging device is configured to detect a wavelength of electromagnetic radiation emitted by the light source.

5. The head-mounted device of claim 1, further comprising:
    a first arm coupled to a first side of the frame; and
    a second arm coupled to a second side of the frame;
    the frame includes:
        a first eyepiece; and
        a second eyepiece coupled to the first eyepiece via a bridge; and
    the plurality of mirrors include:
        a first group of mirrors coupled to a first interior portion of the first eyepiece; and
        a second group of mirrors coupled to a second interior portion of the second eyepiece.

6. The head-mounted device of claim 5, wherein the first imaging device is coupled to the first arm and oriented to capture the first group of mirrors; and
    the head-mounted device further comprising a second imaging device coupled to the second arm and oriented to capture the second group of mirrors.

7. The head-mounted device of claim 1, further comprising:
    one or more processors; and
    memory communicatively coupled to the one or more processors, the memory storing instructions that, when executed by the one or more processors, configures the head-mounted device to perform operations comprising:
        control the mirror angle adjustment device to adjust the angle of the at least one of the plurality of mirrors based on images captured by the first imaging device.

8. A device comprising:
    a front frame;
    a plurality of mirrors coupled to an interior portion of the front frame to reflect a first eye of a user of the device;
    an arm coupled to the front frame;
    a first imaging device coupled to the arm at a position to capture an image of the plurality of mirrors; and
    a light source coupled to the interior portion of the front frame to illuminate the first eye of the user,
    wherein the plurality of mirrors are disposed within a field of view of the first imaging device such that the first imaging device captures the image of the plurality of mirrors, the plurality of mirrors each directly reflecting the first eye.

9. The device of claim 8, wherein the light source emits electromagnetic radiation having a wavelength longer than 700 nanometers.

10. The device of claim 8, wherein the first imaging device is positioned to simultaneously capture the image of the plurality of mirrors.

11. The device of claim 8, wherein the arm is pivotably coupled to the front frame.

12. The device of claim 11, further comprising:
    a sensor to detect a rotational angle of the arm relative to the front frame; and
    a processor to calibrate the image captured by the first imaging device based on the rotational angle detected by the sensor.

13. The device of claim 8, further comprising:
    a fiducial positioned on at least one mirror of the plurality of mirrors and detectable by the first imaging device; and
    a processor to calibrate the image captured by the first imaging device based on the fiducial, the fiducial identifying a location of the first imaging device with respect to the at least one of the plurality of mirrors.

14. The device of claim 8, further comprising a mirror angle adjustment device to adjust an angle of at least one mirror of the plurality of mirrors relative to the first imaging device so that the at least one mirror of the plurality of mirrors reflects the first eye of the user to the first imaging device.

15. The device of claim 14, wherein the mirror angle adjustment device includes an actuator, and the device further comprising:
    one or more processors; and
    memory storing instructions that, when executed by the one or more processors, causes the device to perform operations comprising:
        tracking a gaze direction of the first eye; and
        controlling, based at least in part on the gaze direction, the actuator to adjust an angle of the at least one mirror of the plurality of mirrors relative to the first eye of the user to reflect the first eye to the first imaging device.

16. A method comprising:
    capturing, with a first imaging device, an image of a plurality of mirrors coupled to a frame of a device, the plurality of mirrors reflecting a first eye of a user of the device, wherein the plurality of mirrors are disposed within a field of view of the first imaging device such that the first imaging device captures images of the plurality of mirrors, the plurality of mirrors each directly reflecting the first eye;
    adjusting, with a mirror angle adjustment device, an angle of at least one mirror of the plurality of mirrors relative to the first eye of the user to align the at least one mirror of the plurality of mirrors to reflect the first eye to the first imaging device; and tracking, based at least in part on the image of the plurality of mirrors reflecting the first eye, a gaze direction of the user.

17. The method of claim 16, wherein adjusting the angle of the at least one mirror of the plurality of mirrors includes calibrating the angle of the at least one mirror of the plurality of mirrors based on at least one characteristic of an anatomy of the user.

18. The method of claim 16, wherein the image of the plurality of mirrors includes a reflection of the first eye from multiple different angles, the method further comprising:
   identifying, with a biometric authentication component, the user based on the reflection of the first eye from the multiple different angles.

19. The method of claim 16, further comprising:
   determining a position of the first imaging device relative to the plurality of mirrors,
   wherein the tracking the gaze direction is based at least in part on the position of the first imaging device relative to the plurality of mirrors.

20. The method of claim 16, further comprising emitting, with a light source, electromagnetic radiation to illuminate the first eye of the user.

\* \* \* \* \*